Patented Feb. 12, 1935

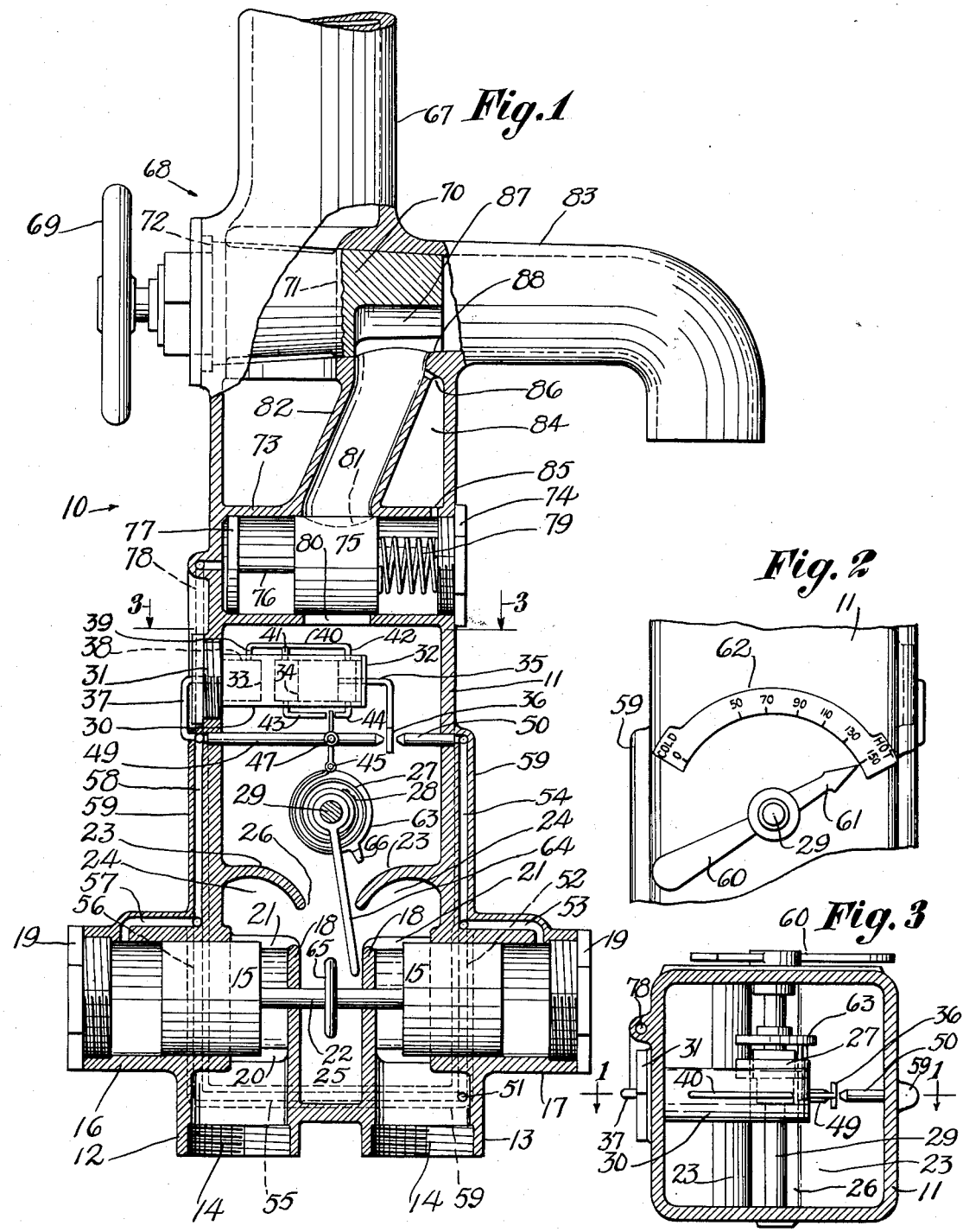

1,990,653

UNITED STATES PATENT OFFICE 1,990,653

AUTOMATIC TEMPERATURE CONTROL FOR FLUID MIXTURES

Paul Kollsman, Woodhaven, N. Y.

Application June 9, 1932, Serial No. 616,236

39 Claims. (Cl. 236—12)

This invention relates to temperature regulating fluid mixing devices.

One object of this invention is to provide a device of the character described having improved means for regulating the flow of fluid streams of different temperatures so that a mixture of a desired temperature is obtained.

Another object of this invention is the provision of a device of the nature set forth having improved temperature responsive flow regulating means operated by the pressure of a fluid for producing a mixture of relatively uniform temperature from fluids of different temperatures.

Another object of the invention is to furnish a device of the type mentioned having improved means for setting the temperature responsive means and for controlling the flow of fluids independently thereof.

Another object of this invention is to construct a device of the class alluded to having temperature responsive flow controlling means for a plurality of fluids of different temperatures, actuated by the pressure of one fluid, as for example, the hotter fluid so as to assure that the flow thereof will be cut off if the flow of the other fluid ceases.

Another object of the invention is to devise an automatic temperature control for a fluid mixture, having an improved temperature controlled by pass.

Another object of the invention is the provision of a valve device for maintaining at a constant temperature a mixture formed of fluids of different temperatures, including improved means having a main and by pass outlet and a unitary means for closing the same.

A further object of the invention is to furnish a device of the character referred to having relatively few and simple parts, and which is comparatively inexpensive to manufacture, durable, rugged, convenient and safe to operate, and reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in vertical section taken on line 1—1 of Fig. 3, with parts in elevation showing a device embodying the invention.

Fig. 2 is a fragmentary rear view thereof.

Fig. 3 is a horizontal sectional view taken on line 3—3 of Fig. 1.

The advantages of the invention as here outlined are best realized when all of its features and instrumentalities are combined in one and the same structure, but, useful devices may be produced embodying less than the whole.

It will be obvious to those skilled in the art to which this invention appertains that the same may be incorporated in several different constructions. The accompanying drawing, therefore, is submitted merely as showing the preferred exemplification of the invention.

Generally described, this invention provides an improved device for mixing fluids of different temperatures so as to obtain a mixture of relatively constant or predetermined temperature. This is preferably accomplished by regulating the flow of one or both of the fluids in response to the mixture temperature, so as to eliminate the effects of changes in temperature or pressure of one or both fluids. Thus individual valves for the fluid streams may be provided, but it will be appreciated, as the description proceeds, that the device is also capable of being used to control the flow of a single fluid in response to the temperature thereof, even where a mixture of fluids is not employed. A feature of the device is that the power for actuating the controlling means or valves is obtained from a fluid whose flow is being regulated. Hence, while the power necessary to move the controlling means may be considerable where the fluid is under pressure, yet the available motive power is also correspondingly great, so that positive regulation is assured. For utilizing fluid energy as motive power any suitable hydraulic means may be employed, subject to a temperature responsive means, as by a valve or orifice control operated by the temperature responsive means. If desired, a power relay, also employing, hydraulically, energy of a fluid may be used for increasing power, whereby a thermostat may delicately control the device. The thermostat may be manually set to any required temperature by a member which may also be used for actuating the fluid control means independently of the thermostat. If control of one of the fluids be more important than control of the other fluid, the hydraulic means may be connected to be operated by energy of that one fluid; in this manner, the control means is independent of variations in pressure as between the fluids of different temperatures, and should the flow or pressure of the other fluid unduly decrease, the flow of the first fluid would nevertheless continue. In the event that the temperature of a fluid or fluids to be discharged varies from the temperature to which the thermostat has been set, a by pass may be automatically opened for discharging such fluid until the required temperature is obtained. The device may have an outlet, and the flow therethrough can be stopped by suitable means located at any required point. If desired, a unitary manually operated valve means may close both the outlet and by pass.

While the invention is adapted for general industrial application, certain advantages thereof will be noted in connection with its use for maintaining a flow of water at any constant temperature to a bath or shower. Particularly in the latter case, the inconvenience of constantly adjusting a plurality of valves to obtain and then maintain a desired temperature is avoided. All that the operator need do is to open a single valve, after setting a pointer at a desired temperature. Nevertheless, if only cold water is desired, the device can be manipulated to obtain the same. Should the supply of cold water for any reason fail, the flow of hot water will be cut off. When the device is first opened, and before the liquids have attained equilibrium at a desired temperature, the liquids are by passed.

Referring in detail to the drawing, 10 denotes a device embodying the invention. The same may include any suitable chamber 11 which may be of elongated form and having at its lower end a plurality of inlets or passages 12, 13 for fluids or liquids of different temperatures. The lower portions of these passages may be threaded at 14 for connection thereto of suitable supply conduits. Preferably said passages 12, 13 are controlled by individual valves 15 that may be hydraulically actuated. According to one possible construction, the passages 12, 13 may have transverse cylinders 16, 17 communicating therewith. Each of these cylinders may have an inner end wall 18, and an outer end wall or closure plug 19. In proximity to the inner end walls, the cylinders may have lower and upper openings 20, 21, the former of which communicate with the inlets and the latter with the interior of the chamber 11, whereby the valves 15 control the flow of liquids into the chamber. Through the walls 18, means such as a rod 22 may slidingly extend for interconnecting said valves so that the same will move as a unit. In order to equalize the pressure around the piston valves and also to promote mixing of the liquids, walls or baffles 23 may be provided which extend inwardly and downwardly. These baffles may otherwise be of any desired form, and provide pressure compartments 24 between the valves and the rest of the chamber 11, so that the pressure on the valves at opposite openings 20 and 21 tends to balance. Moreover, these baffles may extend somewhat over the walls 18 and tend to deflect the liquids toward each other and downward into the space 25 between walls 18, and along inner ends of the cylinders. The mixed liquids then enter the main part of chamber 11 through the orifice 26 provided by the baffles.

For controlling the inflow of liquids so as to obtain a mixture of predetermined constant temperature, a temperature sensitive means such as a thermostat 27 may be used, located at a suitable point in the path of flow of the mixture. This thermostat may be of any desired form and can be variously mounted. Preferably, it is arranged as a spiral so as to have sufficient length, and may be mounted on collar 27 to which its inner end may be fixed at 28, said collar being secured to a shaft 29 extending transversely of the chamber 11 and journaled in the walls thereof. The other end of the thermostat may be connected to a flow controlling or valve means for the cylinders 16, 17.

While the thermostat may directly control the pressure supply to the cylinders, it may in certain cases be desirable to provide a suitable power relay. Hence I provide any desired hydraulic means, which for simplicity, may include a cylinder 30 having a plug 31 secured thereto whereby the same and certain of its connections can be inserted and mounted as a unit in the chamber 11, with the latter suitably sealed. Said cylinder may have an end wall 32 and an intermediate wall 33, between which and the end wall is provided a piston 34. Connected to the piston is a rod 35 extending in a fluidtight manner through wall 32 and carrying a valve or vane 36 for a purpose hereinafter described. Various conduits may be provided for supplying pressure to the cylinder, such as a tube 37 connected to a source of pressure and communicating through the plug 31 with the compartment 38 of the cylinder. Connected to the latter at 39 is a conduit or manifold 40 having branch connections at 41, 42 with the cylinder at opposite sides of the piston 34. Also connected to the cylinder at opposite sides of the piston are outlet tubes 43, 44 which extend toward each other and have opposite outlets in relatively close proximity to each other. Connected to the thermostat 27 at 45 is an element 46 movable by the thermostat to close or open one or the other outlet members 43, 44. Said element is preferably in the nature of a lever having a fixed pivot 47, and by means of this lever the force of the thermostat may be increased.

For controlling the piston valves 15, a plurality of passages or tubes 49, 50 may be provided communicating with the respective cylinders 16, 17, and extending toward each other so that their orifices are in relative proximity to each other. Between the orifices of the tubes 49, 50, the flow control member 36 may be positioned so as to close one or the other according to the movement of the piston. The tubes 49, 50 may be mounted on the walls of chamber 11, and the pivot 47 may be externally mounted on a support or one of said tubes.

Preferably pressure from a single point is taken for cylinders 30 and 16, 17, thus assuring desired related operating pressures. The pressure may be derived from any source, but for convenience, is obtained from one of the controlled fluids. By taking the pressure from a passage such as 13, that is, back of its valve 15, the pressure is obtainable without any drop due to movement of the valve. If the passage 13 is the hot water inlet, added safety is desired by taking the pressure therefrom, since if the supply of cold water should cease, the invention would operate to cut off the hot water. But if the pressure were obtained from the cold water, accidental failure of the same would interfere with the operation of the device so that a person might be scalded by the hot water. Accordingly, I provide a connection as at 51 with a passage 13. Communicating therewith, is an upright passage 52 curved around the outside of cylinder 17 and having one branch passage 53 connected to said cylinder, and a second branch passage 54 leading to the tube 50. Also communicating with inlet 51 is a horizontal passage 55, leading upward at 56, like that at 53, and having a branch connection 57 connected to the cylinder back of piston 15 and a second branch passage 58 leading to tubes 49 and 37. The passages referred to may be formed, for instance, in elongated ridges such as 59 cast with the chamber 11 so as to form parts of the wall thereof.

In order to set the thermostat for a desired temperature, the shaft 29 may have a lever 60 connected thereto externally of the chamber 11, said lever having a pointer 61 movable along a suitable scale or indicia 62, that may be provided on said chamber. If only one of the liquids is desired as in case a person desires a cold shower, the device may be manually operated accordingly, preferably by using the same lever 60 and moving the same to indicate "Cold". For this purpose, and by way of illustration, a knuckle 63 may be mounted on the shaft 29, and an arm 64 may be freely journaled thereon. Said arm 64 may be engageable with a portion or disc element 65 mounted on rod 22. The arm may be actuated by a lug 66 of the knuckle, so that by turning the lever sufficiently the knuckle comes into coaction with the arm to cause the same to move the valves 15 as a unit toward the left. The lever 60 may be suitably held, frictionally or otherwise in this position.

At the upper end of the chamber 11, an outlet 67 may be provided which may be closed or otherwise controlled by any suitable valve 68. The latter may be manually operated as by a handwheel 69, and may include a plug 70, for example, having a through opening 71, said plug being sealed in any feasible manner at 72 and being connected to the handwheel.

If the liquid mixture is for any reason to be by passed, a suitable device is provided responsive to the mixture temperature and preferably adapted to be positively closed against leakage. Hence the chamber may have a cylinder 73 which may extend transversely thereof and having at one end a closure plug 74. This cylinder is of smaller size than the chamber so as to afford ample space for the flow of liquid therearound to the outlet 67. Within the cylinder 73, a piston valve 75 may be provided having connected thereto as by a rod 76 a piston disc 77. The latter may be actuated by fluid pressure, which may be supplied through a passage 78 communicating with the passage 58. Opposing the movement of the piston disc 77 is an automatic means, such as an expansion coil spring 79. In the neutral or mid position shown, the valve 75 closes opposite inlet and outlet openings 80, 81 in the cylinder 73. The opening 80 is in communication with the interior of the chamber while the latter is connected to a passage 82 which may lead to a lateral by pass outlet 83. In order to release pressure between the piston valve and the plug 74, the space 84 between the passage 82 and the adjacent side wall of the chamber may be suitably enclosed to form a compartment or passage. Small openings 85, 86 may respectively intercommunicate said passage 84 with the cylinder 73 and the passage 82 in proximity to the upper end of the latter. For positively closing the outlet 83, the valve 68 may constitute a unitary means for controlling both of the outlets 67 and 83. One possible arrangement, is to sufficiently elongate the plug 70 and provide a laterally and axially opening passage 87 therein, at one side of the axis thereof, which passage 87 is adapted to communicate with the passage 82 laterally and with the outlet 83 endwise. Adjacent to the communication with passage 82, the valve element 70 may have a seat at 88. It will be further noted that the arrangement of valve passages 71 and 87 is such that both may be simultaneously opened and that both may be closed by a suitable turn, as through an angle of 90 degrees.

The operation of the device will now be briefly described. The operator sets the lever 60 at the required temperature, thereby turning shaft 29 and adjusting the tension on the thermostat 27. Then the valve 68 is opened, opening outlet 67 and by pass 83. Usually, in the beginning the water mixture starts cold, as the hot water may have been cooled in the pipe feed line. Meanwhile the water from the hot connection enters inlet 51 and flows through passages 52, 53, 55, 56, 57 to the cylinders 16, 17, and through passages 58, 37 and conduit 40 to the cylinder 30, and through passages 58, 59 to the tubes 49, 50. The liquid mixture being too cool, the thermostat 27 moves to close one of the outlets 43, 44 of cylinder 30, creating an unbalance in pressure therein, so that piston 34 moves in the proper direction to move the vane 36 between the orifices of tubes 49, 50 for creating an unbalance of pressure therein. Thus, assuming that tube 49 is closed, the pressure therein may become sufficient so that pressure builds up in cylinder 73 against piston disc 77 to cause the piston valve 75 to move toward the right against the force of spring 79 and hence to by pass the mixture through passages 82 and 87 and outlet 83. As soon as the temperature comes approximately within the required range, the unbalance of pressure in cylinder 30 diminishes, under control of the thermostat, and correspondingly the member 36 may move so as to decrease the pressure in passage 58, whereupon the valve 75 is closed under the force of spring 79. While the foregoing occurred, the valves 15 in cylinders 16, 17 moved toward the right, increasing the supply of hot water and decreasing the supply of cold water. When the required temperature of the mixture is attained the valves 15 are in proper position for maintaining a suitable flow of hot and cold liquid to obtain a mixture of desired temperature. Should the pressure or temperature of either of said liquids vary in course of use of the device, the operation as above described will again occur, except that the valve 75 will not ordinarily be operated. Should the cold water for any reason fail the operation of the device would continue in the normal manner, and the hot water passage would be closed. If the operator desires to obtain only cold water, the lever 60 is moved sufficiently so that the knuckle 63 actuates arm 64 and hence disc 65 to move both valves 15 toward the left. It will be understood that all outlet passages herein provided, may, wherever necessary, be of sufficient size to cause a drop in pressure to afford the necessary differential for operating the power relay 30 and assuring operation of the valves 15, and the tubes 43, 44, 49, 50 may in this sense be regarded as discharging into a reduced pressure region or into atmosphere. To close the device, a simple turn of the valve 68 is sufficient, which closes outlet 67 and by pass 83 so that no leakage at valve 75 will find its way out. The valve control means of the device, for valves 15 and 75 is then idle and inoperative.

All passages for conveying liquids for controlling the valves may be so adjusted in relative size and capacity as to obtain required relationships of flow and pressure for operating the valves as described.

It will be appreciated that various changes and modifications may be made in the device as shown in the drawing, and that the same is submitted in an illustrative and not in a limiting sense, the scope of the invention being defined in the following claims.

I claim:

1. A device including means for controlling the flow of fluids of different temperatures, including passages and alined piston valves movable transversely thereto, means for mixing the fluids, means responsive to the temperature of the mixture, and means for exerting a direct hydraulic pressure on the piston valves, subject to the temperature responsive means, to obtain a mixture of constant temperature.

2. A mixing device including means for controlling the flow of a plurality of streams of liquids of different temperatures, and adjustable means responsive to the temperature of a mixture of the liquids for operating the flow controlling means so as to maintain a predetermined temperature of the mixture, and common means for setting at will the adjustable means and the flow controlling means said common means including an element individual to the flow controlling means for setting the latter.

3. A device including a mixing chamber having inlets for liquids of different temperatures, alined piston valves separately controlling said inlets and movable transversely thereto, thermostatic means in the mixing chamber responsive to the temperature of the liquid mixture, means subject to the temperature responsive means for direct hydraulic action on the piston valves, for causing said valves to open and close to maintain a constant temperature of the mixture.

4. A mixing device including a plurality of piston valves for controlling the flow under pressure of liquids having different temperatures, means causing the piston valves to be directly operated by power derived from said pressure, and temperature sensitive means responsive to a mixture of the liquids and coacting with the first mentioned means to cause the mixture to be maintained at a relatively constant temperature.

5. A device for mixing streams of liquids at different temperatures flowing under pressure, including means responsive to the temperature of a mixture of the liquids, and means controlled by the temperature responsive means so as to maintain a constant temperature of the mixture, said controlled means including piston valves directly actuated by a flow of liquid and causing said flow of liquid to be discharged into the mixture of liquids.

6. A device including a mixing chamber having inlets for receiving liquids of different temperatures, means responsive to the temperature of a mixture of the liquids, piston valves for separately controlling the flow of said liquids, actuator means for causing the piston valve means to be directly operated by a liquid under pressure, and the temperature responsive means coacting with the actuator means to create a differential pressure of the operating liquid whereby the flow controlling means are operated to maintain a constant temperature of the mixture, and common means for setting the temperature sensitive means and for setting the valve means, including an element for directly actuating the valve means.

7. A device for mixing streams of liquids at different temperatures flowing under pressure, including means responsive to the temperature of the mixture, and valves directly hydraulically actuated for proportionately regulating the volumes of flow of the different liquids to each other, said valves being subject to the temperature responsive means so as to obtain a mixture of relatively constant temperature, and common means for operating the valve means and rendering inoperative the temperature responsive means.

8. A mixing device including separate valve elements for individually controlling the flow of a plurality of fluid streams of different temperatures, said valve elements being interconnected to move as a unit with one valve element opening and the other closing, hydraulic means for actuating the valve elements in opposite directions, responsive to the temperature of a mixture of the liquids for causing the hydraulic means to exert superior force on the valve elements in one or in an opposite direction, a by pass, and the hydraulic means including means for hydraulically controlling the by pass.

9. A device including a mixing chamber having a plurality of inlets for liquids of different temperatures, said mixing chamber having oppositely extending baffles forming individual primary liquid passages, said baffles forming a secondary passage therebetween for causing the inflowing liquids to flow toward each other and through the secondary passage to form a mixture, means responsive to the temperature of the mixture, and piston valves for regulating the inflow of the liquids operated by the temperature responsive means, said piston valves being projectible into said primary passages to control the flow therethrough.

10. A mixing device having hot and cold liquid inlets for a plurality of liquids of different temperatures flowing under pressure, hydraulic means connected solely with the hot liquid inlet, and a plurality of valves for said inlets individually hydraulically actuated by the hydraulic means for controlling the flow of the liquids, and means responsive to the temperature of a mixture of the liquids for controlling the hydraulic means.

11. A mixing device for a plurality of liquids of different temperatures flowing under pressure, including piston valves for the liquids, a temperature sensitive means responsive to the temperature of a mixture of the liquids, actuator means responsive solely to pressure of the liquid of higher temperature controlled by the temperature responsive means, and means for directly hydraulically operating on said valves controlled by said actuator means.

12. A mixing device for liquids of different temperatures flowing under pressure, including hydraulic means operated by the pressure of one of said liquids, said hydraulic means including valves for controlling the flow of said liquids, a hydraulic power relay operated by pressure of one of said liquids, for operating said hydraulic means, and means responsive to the temperature of a mixture of the liquids for actuating the hydraulic power relay.

13. A mixing device for liquids of different temperatures flowing under pressure, including piston means for controlling the flow of said liquids, means responsive to the temperature of a mixture of the liquids, hydraulic power means whereby the controlling means is actuated by the temperature responsive means, means for receiving the mixture of liquids, means for by passing the mixture of liquids relative to the receiving means, and piston means for controlling the by passing means, operated by the hydraulic power means.

14. A device including a means having openings for receiving and discharging a liquid, means for by passing the liquid from the discharging opening, hydraulic power means for controlling the by passing means, and means responsive to the temperature of the liquid for operating the controlling means.

15. A device for automatically controlling the temperature of a fluid mixture, including a chamber for receiving and mixing fluids of different temperatures, means responsive to the temperature of the fluid mixture, hydraulic power means actuated by a liquid pressure differential and operated by the temperature responsive means for controlling inflow of the different fluids into said chamber, unitary independent means operable at will for directly controlling the inflow of said fluids, and for adjusting the temperature responsive means, said chamber having a valve controlled outlet, said hydraulic power means coacting with the valve controlled outlet so as to render the hydraulic power means inoperative when the outlet is closed.

16. A mixing device for fluid streams, including means having separate passages for fluids at different temperatures, and a chamber for mixing said fluid streams, means responsive to the temperature of the mixture of fluid streams, and means for controlling the flow of said fluid streams through said passages, said controlling means including piston valve means for said passages, and hydraulic means acting in opposed relation on opposite ends of said valve means, said controlling means being connected with the passage having the fluid of higher temperature so as to be actuated thereby, and said controlling means being controlled by the temperature responsive means.

17. A device for automatically controlling the temperature of a fluid mixture, including a mixing chamber having inlets for receiving fluids of different temperatures, said chamber having a main outlet, means for controlling the flow of one of said fluids into the mixing chamber, means responsive to the temperature of the fluid mixture for operating the controlling means, a by pass outlet for said chamber, and a common valve means for the main and by pass outlets.

18. A mixing device for fluids of different temperatures flowing under pressure, including means responsive to the temperature of a mixture of the fluids, means for controlling the flow of the fluid having the higher temperature, said controlling means being hydraulically operated, said controlling means being actuated by the temperature responsive device, a by pass, and hydraulic means for controlling the same, an outlet for the fluid mixture, and a single manual means for controlling said by pass and outlet independently of the temperature responsive means.

19. A mixing device for fluids of different temperatures, including means for controlling the flow of said fluids, means responsive to the temperature of a mixture of the fluids, and means operated by the temperature responsive means for actuating the flow controlling means so as to cut off the flow of one of said fluids if the flow of the other fluid accidentally ceases, and manual means for alternately setting the temperature responsive means and the flow controlling means.

20. A mixing device for fluids of different temperatures, including oppositely related valve means for controlling the flow of said fluids, means responsive to the temperature of a mixture of the fluids, means hydraulically actuated by one of the fluids and operated by the temperature responsive means for acting in opposite directions on the valve means so as to cut off the flow of said fluid if the flow of the other fluid accidentally ceases, a by pass, and the hydraulic means including means for controlling the by pass.

21. A device including a mixing chamber having an outlet and a plurality of inlets for fluids of different temperatures, means responsive to the temperature of a mixture of the fluids, control means operated by the temperature responsive means so as to control said inlets for maintaining a predetermined temperature of said mixture against hot and cold temperature variations therefrom, said chamber having a by pass outlet, valve means independent of said control means for automatically opening the by pass outlet if the mixture temperature undergoes one of said variations from the predetermined temperature, and a single manual means for simultaneously opening and closing said outlet and said by pass independently of the temperature responsive means.

22. A device including a mixing chamber having an outlet and a plurality of inlets for fluids of different temperatures, means responsive to the temperature of a mixture of the fluids, control means operated by the temperature responsive means so as to control said inlets, said chamber having a by pass outlet, and means controlled by the temperature responsive means for opening the by pass outlet at a predetermined temperature of the fluid mixture, and common means for manually controlling said outlet and by pass outlet.

23. A mixing device for a plurality of fluid streams at different temperatures flowing under pressure, valves for controlling the flow of said fluid streams, a by pass for said mixture, means responsive to the temperature of a mixture of the fluids, a hydraulic power relay actuable by the temperature responsive means, and hydraulic means operated by said relay for controlling the valves and the by pass.

24. A mixing device for a plurality of fluid streams at different temperatures flowing under pressure, including means for controlling the flow of said fluid streams, means responsive to the temperature of the mixture of fluid streams for operating the controlling means, means for setting the temperature responsive means, and temperature indicating means associated with the temperature setting means, the setting means including means for actuating the controlling means independently of the temperature responsive means.

25. A mixing device for a plurality of fluid streams at different temperatures, including automatic means for controlling the flow of said streams, including means responsive to the temperature of the mixture of the streams, and manual means alternately operative for controlling the flow of said streams relatively to each other independently of the temperature sensitive means, and, for setting the latter for a desired control of the flow controlling means.

26. A mixing device for a plurality of fluid streams at different temperatures, having means for automatically controlling the flow of one of said streams, the automatic means including means responsive to the temperature of a mixture of the streams, and a single manual means for setting the temperature responsive means and having an element for controlling the flow of one of said streams independently of the temperature responsive means.

27. A mixing device for a plurality of fluid streams at different temperatures flowing under pressure, including a chamber having inlets for said fluid streams, means for controlling the flow of said fluid stream into the chamber, means responsive to the temperature of a mixture of the fluids in the chamber for operating the flow controlling means, said chamber having a main outlet and a by pass outlet, means operated by the temperature responsive means for controlling the by pass outlet, and a unitary means for closing the main and by pass outlets.

28. A device including a fluid chamber having a main outlet and a by pass outlet, means for controlling said by pass outlet, means responsive to the temperature of fluids in said chamber for operating the controlling means, and a unitary means for closing the main and by pass outlets.

29. A device including a chamber having a plurality of compartments, inlets leading into said compartments, cylinders communicating with said compartments, piston valves in said cylinders movable to project into said compartments transversely of said inlets, means interconnecting said piston valves for movement as a unit, said compartments having a mixing passage, temperature sensitive means adjacent to said mixing passage, hydraulic means communicating with said cylinders remotely from said compartments for actuating the piston valves in opposite directions, and said hydraulic means being controlled by the temperature sensitive means for causing an unbalance of pressure therein.

30. A device including a plurality of fluid inlets, valves for said inlets movable as a unit in one or in an opposite direction for opening one inlet and simultaneously closing the other inlet, temperature sensitive means for controlling said valves, and means for moving said valves in one direction independently of the temperature sensitive means, and said last mentioned means being movable into a position out of coaction with the valves.

31. A device including a plurality of fluid inlets, valves for said inlets movable as a unit in one or in an opposite direction for opening one inlet and simultaneously closing the other inlet, temperature sensitive means for controlling said valves, and means for moving said valves in one direction independently of the temperature sensitive means, and said last mentioned means being movable into a position out of coaction with the valves, and being associated with the temperature sensitive means for adjusting the same in said last mentioned position.

32. A mixing device including means for controlling the flow of fluids of different temperatures, said means having an outlet for the fluid mixture, temperature sensitive means responsive to the temperature of the mixture for causing actuation of said means, a by pass outlet, and a unitary valve for controlling the outlets independently of the temperature sensitive means.

33. A mixing device including means for controlling the flow of fluids of different temperatures, hydraulic actuator means therefor, temperature sensitive means responsive to the temperature of the fluid mixture for controlling said actuator means, a by pass for said mixture, and a valve for said by pass controlled by the hydraulic means.

34. A mixing device including temperature sensitive means settable for a desired temperature of a mixture of fluids of different temperatures, a by pass, and hydraulic means including a hydraulic relay controlled by the temperature sensitive means, said hydraulic means operating the by pass to cause discharge of the mixture when the same is at less than the temperature to which the temperature sensitive means has been set.

35. A mixing device for fluids of different temperatures including passages having inlets for said fluids, cylinders intersecting the respective passages, piston valves in the cylinders projectible into said passages to control the same, means responsive to a temperature of the mixture of fluids to control said valves, said passages having walls on a side of the cylinders remote from said inlets, said walls being spaced from the cylinders and extending transversely of the passages to create a balanced fluid pressure on the projected portions of the piston valves.

36. A mixing device for fluids of different temperatures, including a valve means responsive to the temperature of the mixture of fluids, a hydraulically actuated relay controlled by the temperature responsive means, and hydraulic means operated by said relay to control said valve means.

37. A mixing device for fluids of different temperatures, including means responsive to the temperature of the mixture of fluids, a valve, hydraulic actuator means therefor, and a separate hydraulically actuated relay controlled by the temperature responsive means for operating the hydraulic actuator means.

38. A mixing device for fluids of different temperatures, including means responsive to the temperature of the mixture of fluids, a valve means, hydraulic actuator means therefor, and a hydraulically actuated relay subject to the temperature responsive means for controlling the hydraulic actuator means, the latter and said relay having individual outlets.

39. A mixing device for fluids of different conditions, including means responsive to a condition of a mixture of the fluids, valve means, hydraulic actuator means for the valve means, and a hydraulically actuated relay controlled by said responsive means for actuating the hydraulic means, the latter and the relay having a common supply conduit and individual outlets.

PAUL KOLLSMAN.